United States Patent [19]

Steudler, Jr.

[11] Patent Number: 4,724,797

[45] Date of Patent: * Feb. 16, 1988

[54] HEIGHT-ADJUSTABLE WATERING SYSTEMS FOR POULTRY, SMALL ANIMALS AND THE LIKE

[75] Inventor: Frederick W. Steudler, Jr., New Providence, Pa.

[73] Assignee: Val Products, Inc., Bird-in-Hand, Pa.

[ * ] Notice: The portion of the term of this patent subsequent to Jun. 2, 2004 has been disclaimed.

[21] Appl. No.: 908,162

[22] Filed: Sep. 17, 1986

Related U.S. Application Data

[63] Continuation of Ser. No. 773,128, Sep. 6, 1985, Pat. No. 4,669,422.

[51] Int. Cl.⁴ .............................. A01K 7/00; F16L 3/22
[52] U.S. Cl. ..................................... 119/72; 119/72.5; 248/68.1
[58] Field of Search ............. 119/72, 72.5, 75, 97 AR; 248/59, 68.1

[56] References Cited

U.S. PATENT DOCUMENTS

| | | | |
|---|---|---|---|
| 1,144,593 | 6/1915 | Heiser | 248/59 |
| 1,362,244 | 12/1920 | Farley | 248/59 |
| 4,267,800 | 5/1981 | Keller et al. | 119/72.5 |
| 4,341,182 | 7/1982 | Rustin et al. | 119/75 |
| 4,407,472 | 10/1983 | Beck | 248/68.1 X |

Primary Examiner—Robert P. Swiatek
Attorney, Agent, or Firm—Diller, Ramik & Wight

[57] ABSTRACT

A height-adjustable watering system which includes a watering pipe connected to a source of water and carrying a plurality of drinkers, a stabilizing element positioned above and along the water pipe, an anti-roosting element positioned along and above the stabilizing element, a plurality of brackets each having arms for receiving therebetween the anti-roosting element, the stabilizing element and the water pipe, a flexible suspension cord secured to at least selective one of the brackets, and a quick-release clamp associated with the suspension cords for readily varying the height of the system from a supporting surface to vary the height of the overall watering system as the poultry, small animals or the like grow.

8 Claims, 7 Drawing Figures

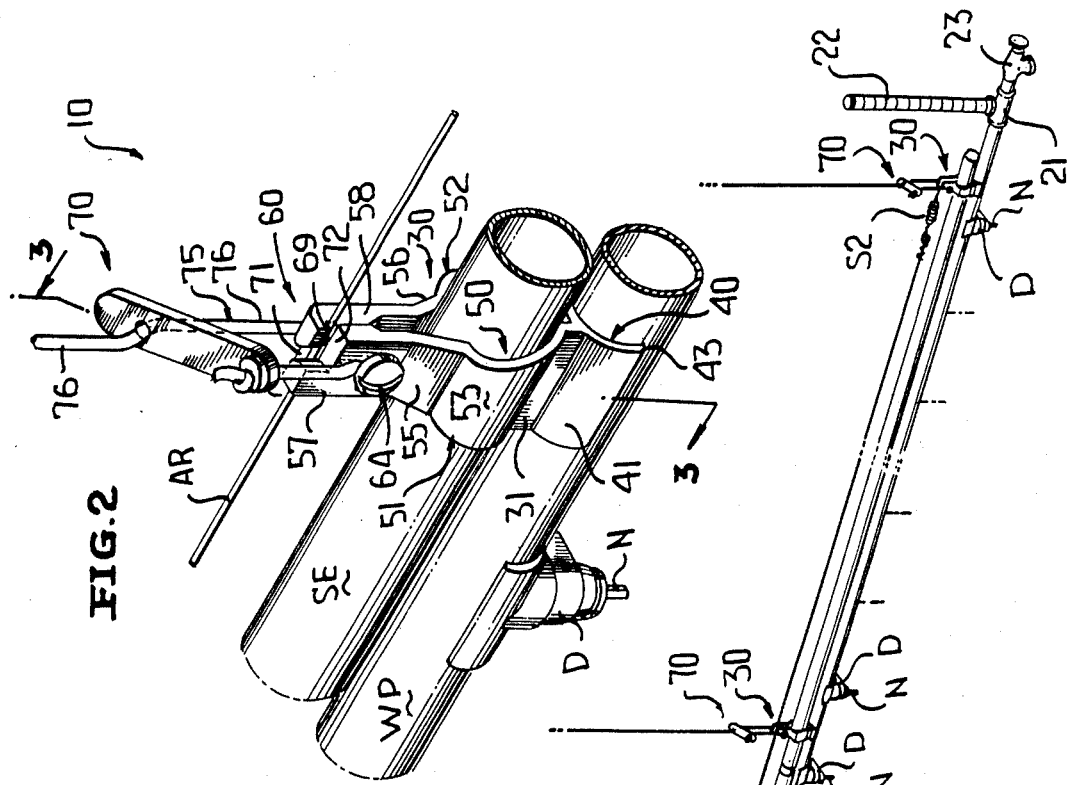
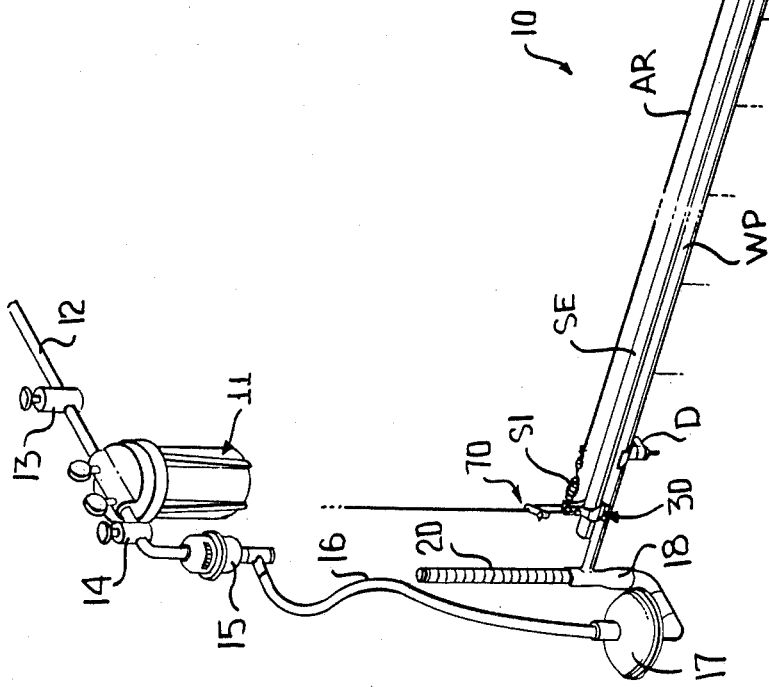

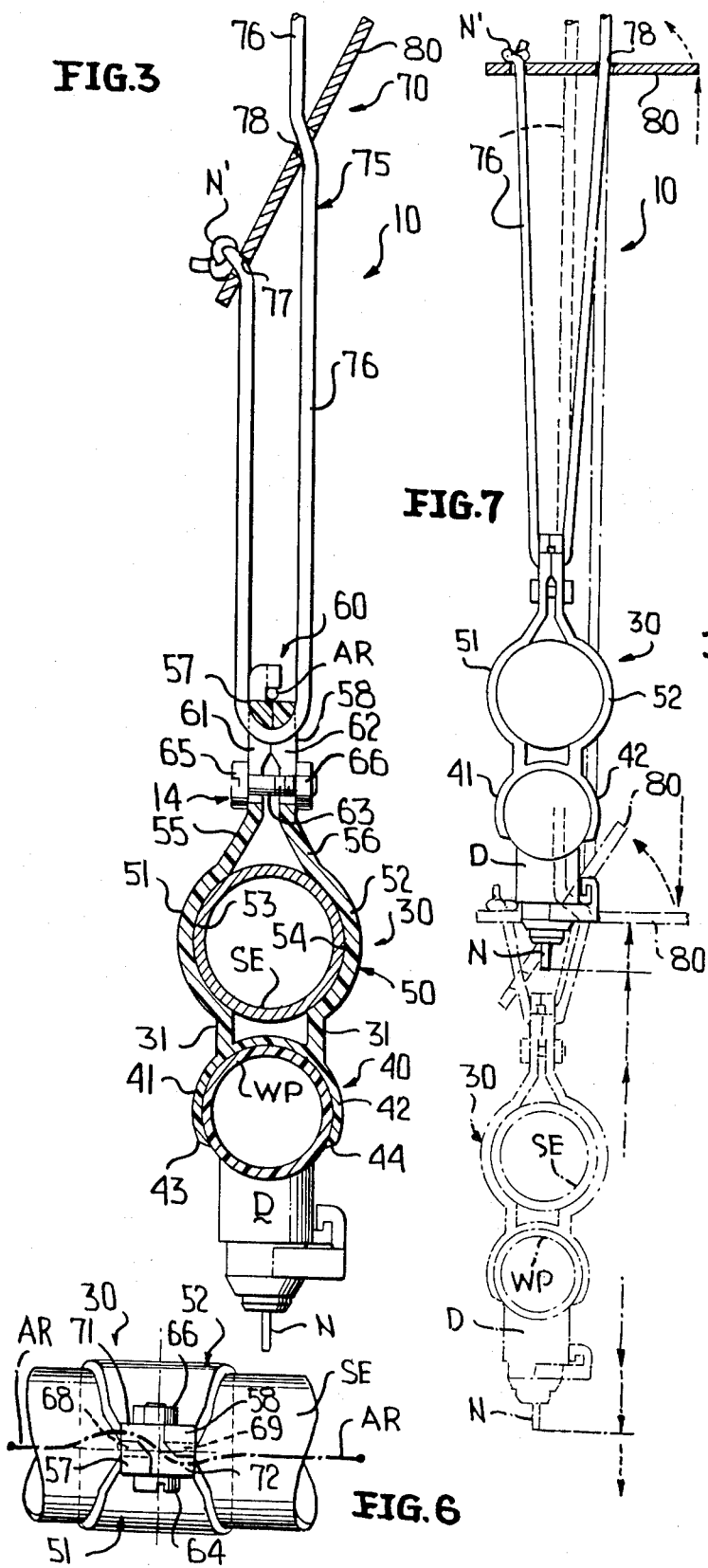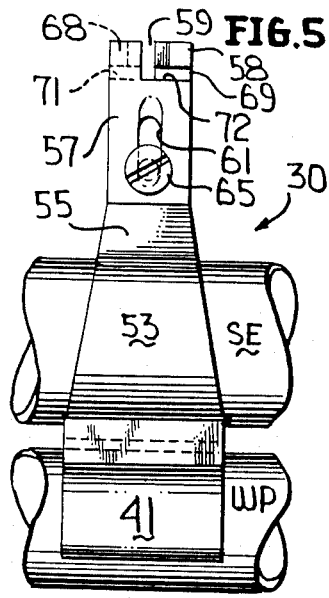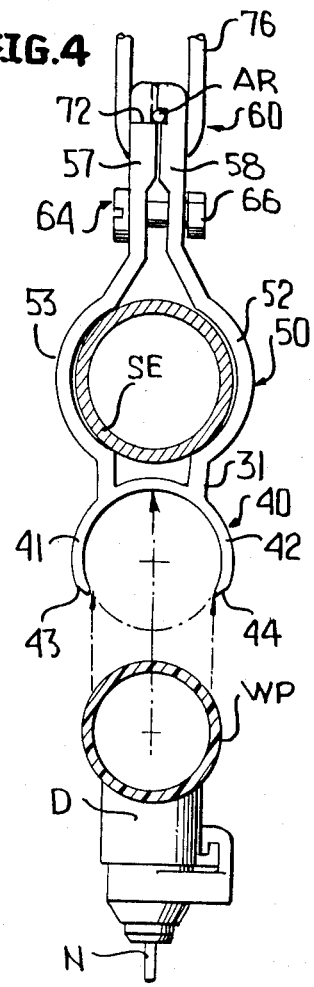

HEIGHT-ADJUSTABLE WATERING SYSTEMS FOR POULTRY, SMALL ANIMALS AND THE LIKE

This is a continuation of application Ser. No. 773,128, filed on Sept. 6, 1985, now U.S. Pat. No. 4,669,422.

The present invention relates to floor a watering system for poultry, small animals and the like which include a plurality of brackets carrying an anti-roosting element, a stabilizing element and a water pipe with a plurality of drinkers. The floor watering system is rapidly adjustable in height to quickly reposition the water pipe and the associated drinkers as the animals/poultry grow. As an example, for starting day-old chicks the water pipe and its drinkers should be low to the "ground" (a stand pipe associated with the water pipe should read 3"), while for older birds (ten days), the water pipe should be higher (stand pipe reading 6"–8"). The watering system height can be increased thereafter in a continuous fashion, as need be, as the birds grow. The height adjustment of the watering system is achieved by a plurality of flexible suspension cords, cables or straps with a loop portion associated with each bracket and a clamp which can rapidly cant between locked and unlocked positions. Thus, once the watering system has been installed, it can be readily elevated (or lowered) as conditions dictate.

In further accordance with this function, each bracket is also so constructed such that all three elements (watering pipe, anti-roosting element and stabilizing element) can be rapidly assembled and disassembled thereto, thus making it quick, simple, and economical to install or disassemble the watering system relative to an associated poultry house.

In further accordance wtih this invention, each bracket is constructed as a one-piece, homogeneous, injection-molded body having two pairs of oppositely directed arms, a first of the arms flexible clamping thereto the watering pipe and the second of the pair of arms engaging and confining thereto the stabilizing element and the anti-roosting element.

As thus briefly described and as will be described more fully hereinafter, the poultry watering system of the present invention provides the latter and other advantages over known conventional systems, as, for example, the system disclosed in U.S. Pat. No. 4,491,088 in the name of Eldon Hostetler, issued Jan. 1, 1985. This conventional system includes suspension cables and clamps or brackets but does not include the novel height-adjustment system and a novel bracket structure associated therewith including the means for securing thereto the anti-roosting element, the stabilizing element and the watering pipe.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a perspective view of a novel poultry/small animal watering system of this invention, and illustrates a plurality of adjustable suspension cables connected to a plurality of brackets each of which as secured thereto an anti-roosting element, a stabilizing element and a watering pipe with a plurality of drinkers.

FIG. 2 is an enlarged perspective view looking in the direction of the FIG. 2 arrow of FIG. 1, and illustrates one of the novel brackets of this invention and the three means thereof for securing the anti-roosting element, the stabilizing element, and the watering pipe through the associated adjustable suspension cable.

FIG. 3 is an enlarged fragmentary sectional view taken generally along line 3—3 of FIG. 2, and illustrates the details of the bracket, a loop of the suspension cable, and a clamp associated with the latter.

FIG. 4 is an end elevational view of one of the brackets or hangers, and illustrates the manner in which the watering pipe is simply snap-secured between a pair of clamping arms of the bracket, while an opposite pair of arms are secured together by a bolt and nut to hold the stabilizing element therebetween.

FIG. 5 is a side elevational view of the bracket or hanger, and illustrates an elongated slot for receiving the bolt and a loop of the suspension cable, and a transverse slot portion of the anti-roosting element slot.

FIG. 6 is a top plan view of the bracket or hanger, and illustrates the manner in which the anti-roosting element is associated with the anti-roosting slot.

FIG. 7 is a schematic end elevational view, partially in phantom outline, and illustrates the manner in which the overall system can be rapidly adjusted in height to accommodate for bird/small animal growth.

A novel poultry/small animal or the like floor watering system constructed in accordance with this invention is fully illustrated in FIG. 1 of the drawings and is generally designated by the reference numeral 10.

The watering system 10 includes a conventional water filter assembly 11 which receives water from a pipe 12 through an appropriate inlet valve 13. The water filter assembly 11 includes a reusable filter cartridge (not shown) through which water is filter before being fed to poultry, small animals, etc. An appropriate valve 14 is provided at the outlet end (unnumbered) of the water filter assembly 11, and the same directs water to a conventional water meter 15. The outlet from the water meter 15 is connected by a flexible pipe 16 to a water regulator 17 which controls the exiting water pressure to a T-coupling 18 having an outlet (unnumbered) connected to a graduated vertical stand pipe 20 and anther outlet (unnumbered) connected to a water or watering pipe WP whose opposite end is connected by another T-coupling 21 to another graduated stand pipe 22 and a valve nozzle 23. The water pipe WP is formed of a plurality of lengths of plastic tubing connected together by suitable couplings C, and each length of tubing carries a number of conventional drinkers D, whose stems or nipples N are activated by poultry/small animals for watering purposes. The water WP is secured to a plurality of brackets or hangers 30, as will be described more fully hereinafter. In addition, the brackets 30 also have secured thereto a 1" diameter galvanized pipe or stabilizing element SE and immediately thereabove and also connected to the brackets 30 is an anti-roosting element or wire AR. The elements WP, SE and AR are disposed in generally spaced parallel relationship to each other, as is most apparent from FIG. 1, and each is carried by the brackets 30 which are in turn suspended by novel suspension means 70 which will be described more fully hereinafter.

Each bracket 30 (FIGS. 2 through 6) is made of a single piece of injection-molded copolymeric or polymeric plastic material, such as polyethylene, and includes respective first, second and third securing means for securing to each bracket 30 the water pipe WP, the stabilizing element SE and the anti-roosting element AR, respectively. The first through third securing means are generally designated by the reference numerals 40, 50 and 60, respectively (FIGS. 3 and 4).

The first securing means 40 for securing the water pipe WP to each of the brackets 30 includes a pair of flexible clamping arms 41, 42 of a body 31 of the bracket 30. The arms 41, 42 project beyond 180° and end in respective flexible end portions 43, 44. The maximum internal diameter of the pair of clamping arms 41, 42 is slightly less than the maximum outside diameter of the watering pipe WP. In order to insert the watering pipe WP between the clamping arms 41, 42 of each of the brackets 30, the terminal ends or end portions 43, 44 must momentarily spread apart to the exterior of the watering pipe WP as is diagrammatically illustrated in the lower portion of FIG. 4, thus, permitting the insertion of the water pipe WP between the clamping arms 41, 42. Once the water pipe WP is fully seated between the clamping arms 41, 42, the latter spring back due to their inherent flexibility to the position best shown in FIG. 3 in intimate clamping engagement with the water pipe WP. However, it should be particularly noted that the watering pipe WP can be clamped to or removed from each of the brackets 30 simply by deflection of the arms 41, 42 in the absence of additive or ancillary fastening devices. Thus, should any particular section of the overall watering pipe WP become defective, it can be quickly uncoupled, cut or otherwise removed and the new piece reinstalled without unclamping, disassembly or other time-consuming manipulation of any one of the brackets 30 or the overall system 10.

The second securing means 50 for the stabilizing element or pipe SE includes a similar pair of clamping arms 51, 52 of each bracket or hanger body 31. The arms 51, 52 are also arranged in pairs, but they project in a direction opposite to the direction of projection of the respective pair of arms 41, 42. The arms 51, 52 include respective curved portions 53, 54; inclined portions 55, 56; and relatively straight portions 57, 58 which also define terminal end portions of the respective clamping arms 51, 52. The clamping arms 51, 52 can be spread apart, due to the inherent flexible nature of the material of each of the brackets 30, a distance sufficient to permit the stabilizing element SE to pass between the terminal end portions 57, 58 and the inclined portions 55, 56 until accommodated within curvature of the curved portions 53, 54, as is best illustrated in FIGS. 3 and 4 of the drawings. When in this position, the natural resiliency of the clamping arms 51, 52 will hold the stabilizing element SE in the position shown between the curved portions 53, 54, but to ensure against inadvertent or accidental disassembly of the brackets 30 relative to the stabilizing element SE, the terminal end portions 57, 58 have vertically elongated slots 61, 62, respectively, through which passes a threaded stem 63 of a bolt 64 having a head 65 and a nut 66 threaded to the stem 63. As is most readily apparent from FIG. 3, the bolt 64 and the associated nut 66 assure that the curved portions 53, 54 of the clamping arms 51, 52, respectively snugly clamp and secure the stabilizing element SE therebetween.

The third securing means 60 is also defined between the terminal end portions 57, 58 of the respective arms 51, 52 in the form of an anti-roosting element receiving slot having two aligned slot portions 68, 69 and a transverse slot portion 59 (FIG. 6) therebetween. The slot portion 68 is formed in the terminal end portion 57 and opens freely toward a cut-out 71 of the end portion 58. The slot portion 69 is similarly formed in the arm 58 and opens through a cut-out portion 72 of the arm 57, as is best illustrated in FIG. 6. The slot portions 68, 69 thereby define generally oppositely opening hooks (see FIG. 3), and in order to assemble the anti-roosting element AR to the brackets 30, the anti-roosting element AR need but be momentarily bent or contoured, as shown in FIG. 6, which is in alignment with the transverse slot portion 59 and the cut-outs 71, 72. Thereafter, the anti-roosting element AR is simply moved downwardly and then straightened at which point it will be received in the slot portions 68, 69, and thus be secured thereby. Opposite ends (unnumbered) of the anti-roosting element AR can be secured directly to the endmost of the brackets 30 (See FIG. 1) or through springs S1, S2 associated therewith. The springs S1, S2 lend added instability to the overall flexible nature of the anti-roosting element or wire AR, thus assuring that should a bird attempt to roost upon the water pipe WP and/or the stabilizing element SE, to do so the bird would encounter the anti-roosting element AR, and the latter virtually precludes the aforementioned undesired roosting. Thus, since birds or small animals can not roost atop any one of the elements WP, SE and/or AR, the overalll system is relatively problem free, particularly as stabilized by the weight added thereto by the stabilizing element SE. Thus, though suspended by the suspension means 70, the system 10 is virtually stable in its suspension and will tend not to swing or sway, even if accidentally bumped or brushed by the poultry or animals.

The suspension means 70 includes a cable, strap or cord 75 having a loop portion 76 threaded through the elongated slots or openings 61, 62 (FIG. 3), and also threaded through openings 77, 78 of a clamping element 80. A knot N' prevents the free end of a suspension cable 75 from passing through the opening 77. As shown in FIG. 3, the canted or inclined position of the clamping element or member 80, which is created by the weight of the overall system 10, causes the edges of the opening 78 to "bite" into the suspension cable 75, thus effectively maintaining the cable 75 at a desired length and, thus, the drinkers D suspended thereby at a desired height above the floor of an associated poultry house, as, for example, indicated by the phantom outline illustration in FIG. 7. However, if it is desired to simply elevate or lower the entire watering system 10, the clamping element 80 of each bracket 30 is simply moved to a horizontal position, as shown in phantom outline in FIG. 7, and the loop 76 is then lengthened or shortened, after which the clamping element 80 is returned to its oblique or canted position. In this fashion, the entire system 10 and particularly the elements WP, SE and AR can be adjustably increased or decreased in height, as illustrated by the phantom and solid lines in FIG. 7, to accommodate the system 10 for birds of different sizes, particularly as birds grow from chicks to and through maturity.

The bracket 30, and particularly the inner surfaces (unnumbered) of the flexible clamping arms 41, 42 are serrated or roughened such that the water pipe WP is tightly gripped therebetween and can not rotate. This assures that the axis of the nipple or pin N will at all times be in a vertical plane to assure that water does not inadvertently drip from any one of the drinkers D.

Although in a preferred embodiment of the invention as has been specifically illustrated and described herein, it is to be understood that minor variations may be made in the apparatus without departing from the spirit and scope of the invention, as defined in the appended claims.

I claim:

1. A hanger bracket particularly adapted for a floor watering system for poultry, small animals or the like comprising a body, said body having first means for securing thereto a length of pipe through which water is adapted to flow for watering poultry, small animals or the like, said body having second means for securing thereto an elongated stabilizing element whose added weight is adapted for stabilization purposes, a flexible suspension element connected to said bracket for suspendingly supporting the same at a predetermined height above a supporting surface, said first and second securing means each being defined by a pair of spaced flexible clamping arms adapted to flexibly embrace and secure therebetween an associated water pipe and stabilizing element, respectively; the clamping arms of the pair of clamping arms project in opposite directions away from each other, a first of said pair of clamping arms opening downwardly and being adapted to receive therein a water pipe, a second of said pair of clamping arms opening upwardly and being adapted to receive therein an elongated stabilizing element, said first and second pair of clamping arms each being defined by first and second clamping arms, means between at least one of said first and second clamping arms for clamping the same intimately against one of the associated water pipe and elongated stabilizing element received therebetween, means for joining a free end portion of one of said first and second arms to said flexible suspension element, and means for adjusting said suspension element to selectively alter said predetermined height.

2. The hanger bracket as defined in claim 1 wherein said first and second securing means at least in part each encircle an associated axis, and said axes are parallel to but relatively spaced from each other.

3. The hanger bracket as defined in claim 1 including third means above said stabilizing element securing means for securing to said body a thin elongated element adapted for anti-roosting purposes.

4. The hanger bracket as defined in claim 1 including third means above said stabilizing element securing means for securing to said body a thin elongated element adapted for anti-roosting purposes, and said first, second and third securing means at least in part each encircle an associated axis, and said axes are generally parallel to but spaced from each other.

5. A hanger bracket comprising first securing means for securing a water pipe thereto, said first securing means including a first pair of flexible clamping arms normally opening in a downward direction, second securing means for securing a stabilizing element to said bracket, said second securing means including a second pair of flexible clamping arms normally positioned above said first pair of arms and normally opening in an upward direction, a bridging portion connecting said pairs of arms to each other, said first and second pair of clamping arms each being defined by first and second clamping arms, at least one of said clamping arms of said second pair of flexible clamping arms having means for securing an anti-roosting element thereto means between at least one of said first and second clamping arms for clamping the same intimately againt the associated water pipe or elongated stabilizing element received therebetween, and means for adjoining a free end portion of said at least one clamping arm to said anti-roosting element.

6. The hanger bracket as defined in claim 5 wherein a second clamping arm of said second pair of flexible clamping arms has means for securing an anti-roosting element thereto.

7. The hanger bracket as defined in claim 5 wherein said second pair of clamping arms have aligned openings therein for receiving a suspension element.

8. A hanger bracket comprising first securing means for securing a water pipe thereto, said first securing means including a first pair of flexible clamping arms normally opening in a downward direction, second securing means for securing a stabilizing element to said bracket, said second securing means including a second pair of flexible clamping arms normally positioned above said first pair of arms and normally opening in an upward direction, a bridging portion connecting said pairs of arms to each other, said clamping arms of said second pair of flexible clamping arms each having means for securing an anti-roosting element thereto, and said last mentioned securing means being aligned openings in each of said clamping arms of said second pair of clamping arms for receiving an anti-roosting element therethrough.

* * * * *